United States Patent [19]

Gerlock et al.

[11] 4,317,939

[45] Mar. 2, 1982

[54] CATALYZED DISSOLUTION-HYDROLYSIS OF POLYURETHANE WASTES

[75] Inventors: John L. Gerlock, Dearborn; Jacob Braslaw, Southfield; both of Mich.; Jane Albright, Bremerton, Wash.

[73] Assignee: Ford Motor Company, Dearborn, Mich.

[21] Appl. No.: 237,008

[22] Filed: Feb. 23, 1981

[51] Int. Cl.$^3$ ............................................. C07C 41/01
[52] U.S. Cl. .................................... 568/121; 568/613; 521/49.5
[58] Field of Search ................. 568/621, 613; 260/2.3

[56] References Cited

U.S. PATENT DOCUMENTS

| | | |
|---|---|---|
| 2,973,151 | 5/1960 | Broeck et al. . |
| 3,109,824 | 11/1963 | Heiss . |
| 3,117,940 | 1/1964 | McElroy . |
| 3,123,577 | 3/1964 | Heiss . |
| 3,300,417 | 1/1967 | McElroy . |
| 3,404,103 | 10/1968 | Matsudaira et al. . |
| 3,441,616 | 4/1969 | Pizzini et al. . |
| 3,632,530 | 1/1972 | Kinoshita . |
| 3,708,440 | 1/1973 | Frulla et al. . |
| 3,738,946 | 6/1973 | Frulla et al. . |
| 3,954,681 | 5/1976 | Castle . |
| 3,983,087 | 9/1976 | Tucker et al. . |
| 4,014,809 | 3/1977 | Kondo et al. . |
| 4,035,314 | 7/1977 | Lohr, Jr. et al. . |
| 4,039,568 | 8/1977 | Sakai et al. . |
| 4,110,266 | 8/1978 | Sheratte . |
| 4,115,298 | 9/1978 | Schneider et al. . |
| 4,159,972 | 6/1979 | Braslaw et al. . |
| 4,162,995 | 7/1979 | Sheratte . |

FOREIGN PATENT DOCUMENTS

| | | | |
|---|---|---|---|
| 1110405 | 7/1961 | Fed. Rep. of Germany | 260/2.3 |
| 2738572 | 8/1977 | Fed. Rep. of Germany . | |

*Primary Examiner*—Howard T. Mars
*Attorney, Agent, or Firm*—Lorraine S. Melotik; Roger L. May

[57] ABSTRACT

Polyol is recovered from polyurethane waste foam and thereafter used to produce high quality new foam. The foam is dissolved in a saturated alcohol, preferably diethylene glycol, having a boiling point between 220° C. and 280° C. at a temperature between 185° C. and 220° C. under a non-oxidizing atmosphere such as nitrogen. Water and an alkali metal hydroxide catalyst, preferably sodium hydroxide, are added to the solution which is then refluxed at a temperature of between about 175° C. and 220° C. still under a non-oxidizing atmosphere until all the carbamates produced during dissolution have been hydrolyzed to amines and alcohol. At least a portion of the solution is subjected to vacuum purification at a temperature below about 230° C. Substantially pure polyol is recovered. Preferably, prior to vacuum distillation, water is removed from the solution.

23 Claims, 2 Drawing Figures

4,317,939

CATALYZED DISSOLUTION-HYDROLYSIS OF POLYURETHANE WASTES

This invention relates to the recovery of polyol from polyurethane foam, which polyol can subsequently be used to produce high quality new foam. More particularly, this invention relates to a process whereby polyether based polyurethane foam is dissolved in a saturated alcohol, the resulting dissolution mixture is hydrolyzed by refluxing in the presence of water and a base catalyst and, the polyol is recovered in substantially pure form after distillation of the hydrolyzed solution.

RELATED APPLICATIONS

Reference is made to related U.S. applications Ser. No. 237,027, filed Feb. 23, 1981 and entitled "Process for Polyol Recovery from Polyurethane Foam Comprising Alcohol and Steam Hydrolysis" and Ser. No. 237,568, filed Feb. 24, 1981 and entitled "Polyol Extraction by High Boiling Alkanes".

BACKGROUND OF THE INVENTION

Currently, it is estimated that manufacturing associated waste generates over 50 million pounds of low density polyurethane foam each year. This foam is generally disposed of in land-fill operations. Because of the economic loss associated with both the land required for land-fill and the foam disposed of in these operations, it is highly desirable to utilize the scrap foam or its chemical components in new product manufacture. One such chemical component which can be recovered from the scrap foam, and which is of particular commercial interest, is polyol, which can be used to manufacture new foam.

Prior art polyol recovery processes have included dissolving the foam and subsequently using the resulting solution without further purification to make new foam. In German Pat. No. 2,738,572, polyurethane wastes are heated in a diol containing a basic catalyst to prepare a homogeneous polyol component to be used in the production of new foam. U.S. Pat. No. 2,937,151 to Broeck et al teaches dissolving scrap foam in high molecular weight polyesters, polyester amides or polyalkylene ether glycols, similar to those used to make the foam; the resulting solution is then crosslinked with isocyanate to generate new foam. Heiss, in U.S. Pat. No. 3,123,577, mills cellular polyurethane plastic, dissolves the particles in a high molecular weight trihydric polyalkylene ether containing a tin catalyst, and reacts the resulting resin with polyisocyanate to form new cellular polyether polyurethane. Tucker et al., in U.S. Pat. No. 3,983,087, heat scrap foam in a glycol wherein the alkylene chain separating the hydroxyl groups is branched. This homogeneous mixture can be used to make new foam. Braslaw et al., in U.S. Pat. No. 4,159,972, dissolve the foam in a low molecular weight diol, admix a high molecular weight polyol therewith, remove the diol under vacuum and use this product to make new foam. Kinoshita, in U.S. Pat. No. 3,632,530 heat the foam in a glycol and an amino compound in the presence of a tertiary amine catalyst. Upon standing, the mixture separates into a glycol containing amine layer and a layer comprising polyalkylene ether glycol. The polyol layer is used to produce new foam. Frulla et al, in U.S. Pat. No. 3,738,946 heat scrap foam in an aliphatic diol, preferably in the presence of a dialkanolamine. The resulting material is used without further purification to make new foam. U.S. Pat. No. 3,708,440 to Frulla et al. is similar, employing an aliphatic diol and a dialkanolamine. McElroy, in U.S. Pat. No. 3,300,417, liquifies a polyurethane plastic by heating the polyurethane in an organic liquid in the presence of a metal catalyst, preferably a tin compound. The resulting liquid is reacted with a polyisocyanate to prepare a new cellular polyether polyurethane.

Hydrolysis has also been used on polyurethane foam to recover polyol. Lohr, in U.S. Pat. No. 4,035,314, hydrolyzes foam using superheated steam, dissolves the resulting oily residue in solvent, and further treats this mixture by a process comprising gassing with hydrochloric acid gas and ultimately recovering polyol. Pizzini et al, in U.S. Pat. No. 3,441,616, hydrolyze a polyether polyurethane foam with a strong base in a dimethylsulfoxide-water medium, extract the resulting polyol with a hydrocarbon solvent immiscible with the hydrolysis medium, separate the polyol solvent layer and strip off the solvent to recover polyol.

In spite of the numerous known processes for scrap foam utilization and polyol recovery, however, scrap foam is still generally disposed of in land-fill operations, indicating that none of these polyol recovery processes is commercially feasible. Therefore, a commercially feasible process for high grade polyol recovery has continued to be the subject of research.

An object of the subject invention is the recovery from scrap or waste polyether polyurethane foam of substantially pure polyether polyols, which, unlike prior art recovered polyol, are physically and chemically indistinguishable from the virgin polyol used to make the original foam, and may then be used to produce a high quality flexible foam of high resilience.

A further object of the invention is the processing of the foam in a commercially economical and rapid manner.

BRIEF DESCRIPTION OF THE INVENTION

It has been found that substantially pure polyether polyol can be readily recovered from polyether polyurethane waste foam by a process which includes first dissolving the foam in a saturated alcohol at a temperature between about 185° C. and 220° C. under a non-oxidizing atmosphere. The alcohol has a boiling point of between about 225° C. and 280° C.

Alkali metal hydroxide catalyst and water are added to the solution, the water being added in an amount sufficient to create a mixture which has a boiling point within the temperature range of from about 175° C. to about 220° C. The alkali metal hydroxide catalyst is added in an amount of at least about 0.1 weight percent based on the weight of said foam. The solution is then refluxed, still under a non-oxidizing atmosphere, for a time necessary to substantially hydrolyze dissolution products subject to hydrolysis into amines and alcohol. During hydrolysis the temperature of the solution is maintained between about 175° C. and 220° C. At least a portion of the resulting solution is then subjected to vacuum purification at a temperature below about 230° C. so as to allow recovery therefrom of substantially pure polyol. In this process, the portion of the hydrolyzed solution which is subjected to vacuum distillation may be the polyol layer which forms after the solution has been allowed to stand.

In the process of this invention by substantially pure polyol is meant that the recovered polyol is substantially free of recovery process by-products which reduce the quality of the new foam generated from the recovered polyol and thus limit the amount of recovered polyol that can be used to replace virgin polyol in new foam production. Furthermore, it is meant to describe a polyol which may be used to replace virgin polyol in substantial amounts in new foam production and yields a polyurethane foam with similar properties to the foam made with all virgin polyol.

DETAILED DESCRIPTION OF THE INVENTION

Typical low density polyurethane foams which can be processed by means of this invention are formed by reacting difunctional isocyanates with water, excess difunctional isocyanates and polyether triols. The polyurethane structure consists essentially of polyurea chains crosslinked with the triols by means of urethane linkages. In some foams, this structure is modified and further crosslinked by the presence of allophanate linkages which may occur when additional excess isocyanates are introduced. The preparation of the foam may also include catalysts, surfactants, fillers and other modifiers including amines in minor amounts. In addition to flexible foam, semi-flexible and rigid foams can also be utilized in the recovery process of this invention.

The polyether polyurethane foams which can be processed by the method of this invention, however, are not limited to those produced as described above.

The initial step of the invention comprises reacting the foam with a saturated alcohol, wherein the hydroxy functionality of the alcohol causes dissolution of the polyurethane, forming dissolution products which comprise polyol, ureas and carbamates. Any saturated alcohol with a boiling point between about 225° C. and 280° C. can be used. The alcohol can contain single or multiple hydroxy functionality and it can be straight chain, branched, cyclic or aromatic. Low molecular weight diols such as diethylene glycol, dipropylene glycol, dibutylene glycol, glycerol, or even polyether triols are preferred solvents. However, diethylene glycol is particularly preferred for reasons including availability and relatively low cost. Additionally, it is conveniently removed under vacuum from the recovered polyol at temperatures below about 230° C., thereby preventing discoloration and degradation of the polyol that can occur at higher temperatures.

Figure 1:
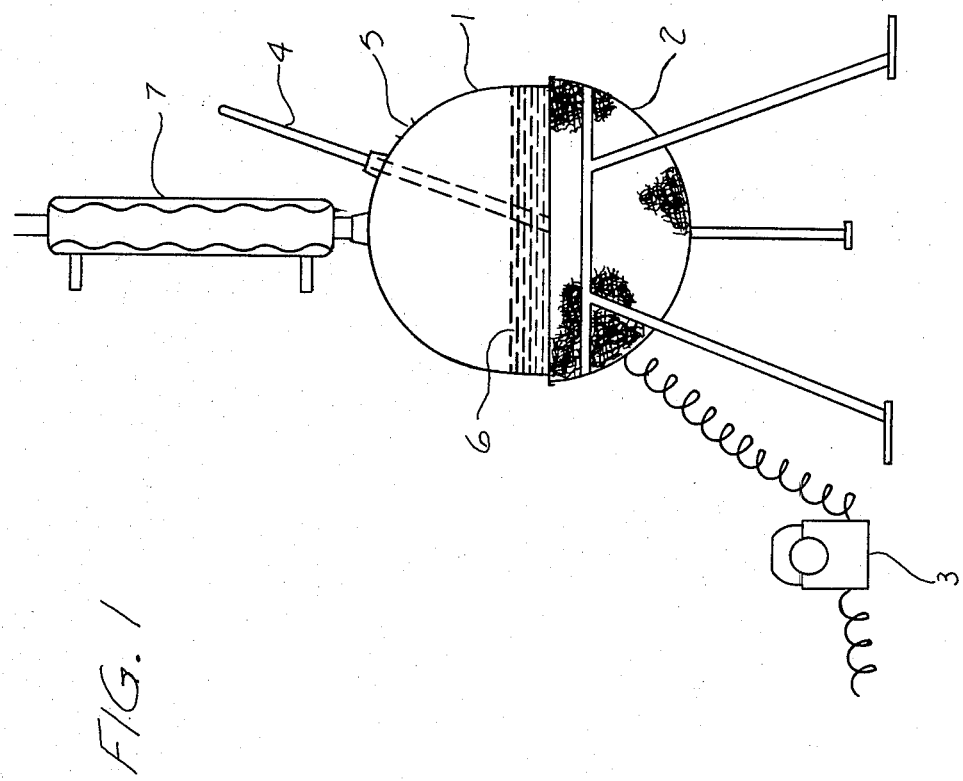
FIG. 1 shows a typical laboratory apparatus set-up which could be used in the process of the subject invention.

After first preheating the alcohol to between about 185° C. and 220° C., preferably about 200° C., with constant stirring, pieces of polyurethane foam are added until dissolution occurs, after which more pieces of foam are added. The process of the invention is carried out in a non-oxidizing atmosphere. As used herein "non-oxidizing atmosphere" means any atmosphere that excludes oxygen and does not lead to the formation of undesirable side reaction products, i.e. any polyol side reaction products or other side reaction products that may interfere with isolation of polyol from other reaction products. Suitable non-oxidizing atmospheres which can be provided are, for example, nitrogen, carbon dioxide, steam or the inert gases. A conventional laboratory set-up, as shown in FIG. 1 can be used in the process of this invention. The solution 6 is heated in a reactor 1 under a non-oxidizing atmosphere such as nitrogen which enters the reactor through 5. A conventional heating unit 2 is controlled by thermostat 3. The temperature of the solution is indicated by thermometer 4 immersed in the solution. A conventional stirrer (not illustrated) is used.

The amount of polyurethane foam that may be dissolved in the alcohol is limited only by the viscosity of the resulting solution, the more dissolved, the higher the viscosity. The ratio by weight of foam which can be dissolved, for example in diethylene glycol is between about 1:5 and 2:1, the preferred ratio being between 1:1.5 and 1.5:1. Most preferably, the weight ratio of foam to alcohol is 1:1. Using this process with rapid mixing, it takes less than one hour to dissolve 70 grams of foam in 70 grams of diethylene glycol and less than two hours to dissolve 200 grams of foam in 100 grams of diethylene glycol when the temperature of the liquid is maintained at about 190° C. The dissolution rate is faster at higher temperatures.

The amounts and rates will, of course, vary with other alcohols and depend on the particular foam used. Additionally, the size of the pieces of foam to be dissolved will affect the time required for dissolution. Generally, foam pieces of about 3"×3"×3" are conveniently used. However, various factors such as reactor size and type of foam will influence the optimum size of foam pieces to be processed according to this invention and both larger and smaller pieces may be used.

Following dissolution, water and an alkali metal hydroxide are added to the solution either separately or as a solution of catalyst in water. The water is added in an amount sufficient to produce a solution that would boil at a temperature of between about 175° C. and about 220° C. When using preferred diethylene glycol, water is added in an amount by weight of between about 2.4% and about 0.6% of the diethylene glycol, preferably in an amount of about 1.1% by weight to maintain the stated temperature. The catalyst is added in an amount of at least about 0.1, preferably from about 0.1 to about 10, weight percent based on the weight of the foam, with 0.5 to about 3 weight percent being more preferred, 1.5 weight percent being most preferred. Although any alkali metal hydroxide can be used as a catalyst, sodium hydroxide is preferred. It is relatively inexpensive and does not precipitate out of solution in the presence of carbon dioxide, a hydrolysis reaction by-product. Lithium hydroxide can also be used as a catalyst. However, in this instance, a compound such as calcium hydroxide preferably is added. The calcium hydroxide reacts with the carbon dioxide, leaving the lithium hydroxide in solution to function as a catalyst. Otherwise, the lithium hydroxide can react with the carbon dioxide and be removed from the solution as a precipitate. Calcium hydroxide would be added in an amount in excess of the lithium hydroxide, preferably in a weight ratio of about 10:1. If a compound such as calcium hydroxide is not added in addition to the lithium hydroxide, it will be necessary to continue adding lithium hydroxide to the solution, in order to maintain the desired concentration of lithium hydroxide catalyst. However, since lithium hydroxide is relatively expensive, this is undesirable.

The solution containing water and catalyst is then refluxed, using a reflux condenser 7 until substantially all the carbamates and ureas have been hydrolyzed to amines and alcohol. Since some of the water in solution is consumed during reaction, the desirable water concentration is maintained through the addition of small amounts of water during refluxing. By maintaining the concentration of water in solution, for example when using diethylene glycol, between about 0.6% and 2.4% as stated above, the temperature is correspondingly maintained between about 220° C. and 175° C. Other alcohols require different water concentrations. A temperature of 200° C., which for diethylene glycol corresponds to about 1.1% water, is preferred.

The completeness of the hydrolysis reaction is periodically determined by analyzing a sample of the solution for carbamate concentration. This may be done conveniently using high performance liquid chromatography. When using diethylene glycol hydrolysis is complete in less than 4 hours at the preferred concentrations of water and catalyst, most of the carbarmates having been hydrolyzed in about 30 minutes. The time required for hydrolysis appears to be independent of the particular foam to alcohol ratios used, as long as they are maintained within the limitations of this invention. However, the time may vary based on the particular alcohol, foam, temperature and catalyst including amount used, for example.

Preferably, after hydrolysis is complete, the water is removed from solution by evaporation. To do so, the condenser is by-passed and the solution is heated to about 220° C. It is a matter of convenience to remove water at this point rather than during the subsequent vacuum purification. Additionally, if the water is not removed, and the solution were to be cooled to below about 110° C., perhaps for ease of handling, the solution would form an undesirable gel.

Thereafter, at least a portion of the solution is subjected to vacuum purification at a temperature below about 230° C. to remove any amines, alcohol or water which may be present. Vacuum purification as used in this application includes any process by which desirable end product (polyol) and impurities are separating using vacuum means. Exemplary of such means are conventional distillation apparatus and thin film evaporators. Other apparatus for effecting the desired separation will be apparent to those skilled in the art.

If the hydrolyzed solution is allowed to stand, the solution may separate into a polyol layer and an alcohol layer containing most of the amines. If styrene and/or acrylonitrile was a component of the scrap foam, it will be distributed primarily in the alcohol layer. The occurrence of layer formation appears to be dependent on the particular alcohol used. In the embodiment of the invention wherein diethylene glycol was used as in the examples, the solution separates into a polymer upper layer and a diethylene glycol lower layer. In this preferred case of layer separation, the polyol layer is removed and this polyol portion of the solution is then subjected to vacuum purification. If the solution remains homogeneous, the entire solution would be subjected to vacuum purification. Thereafter, substantially pure polyol is recovered.

Figure 2:
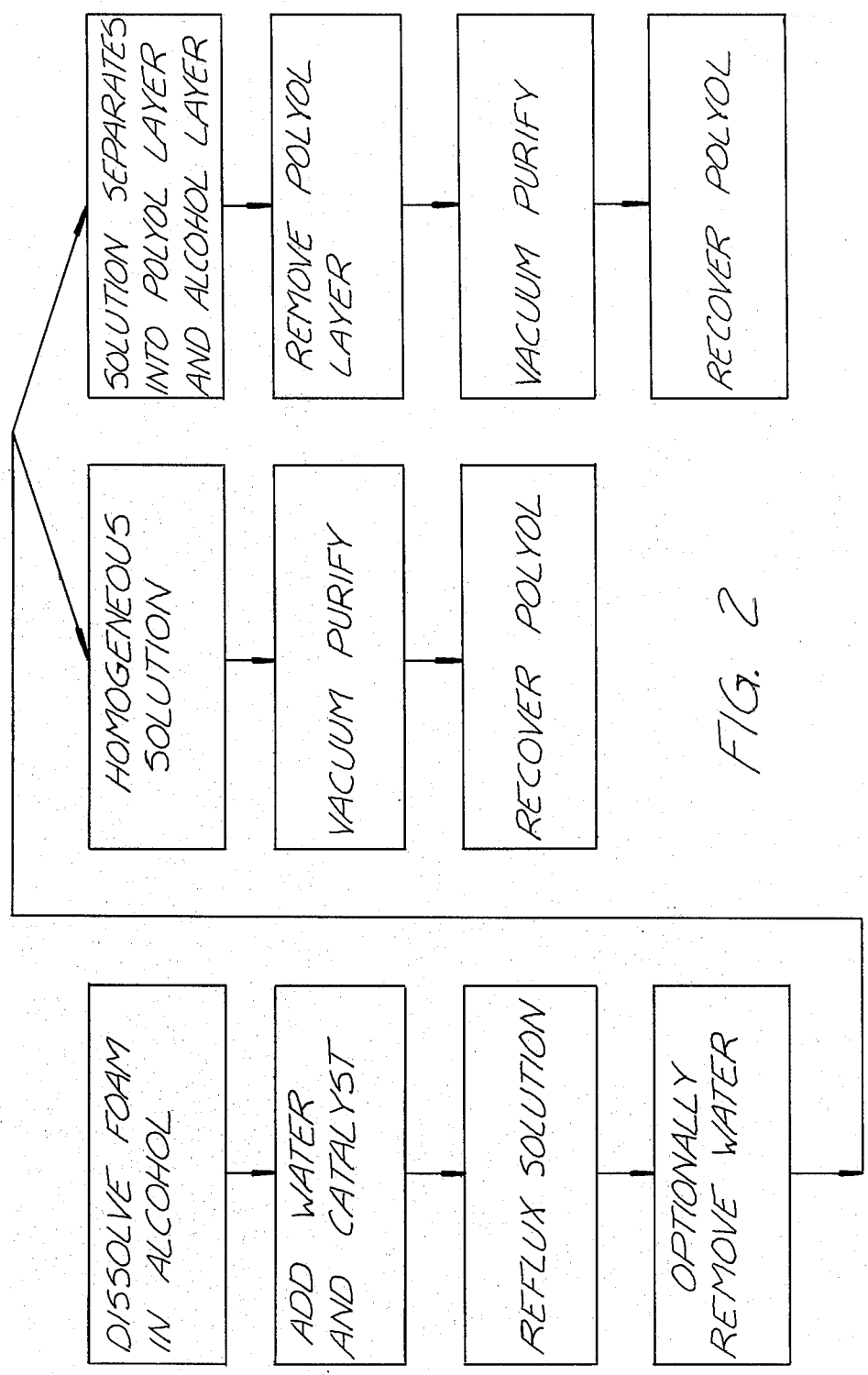
FIG. 2 depicts a schematic flow diagram of the subject process.

This process is illustrated in the flow diagram shown in FIG. 2.

The following examples are presented by way of description of the process of the invention and to set forth the best mode contemplated by the inventors, but are not to be construed as limiting.

EXAMPLE 1

A 600 gram sample of waste polyurethane foam prepared according to the formulation given in Table 1 was added with rapid mixing to 600 grams of diethylene glycol under nitrogen at 200° C. over a period of 45 minutes. Eight grams of sodium hydroxide and eight grams of water were then added to the reaction mixture and a reflux condenser was then placed on top of the reactor. Small 0.5 cc additions of water were used to maintain the reaction mixture refluxing at 200° C. (still under nitrogen). High performance liquid chromotography of a series of 0.1 cc samples withdrawn from the reactor every 15 minutes indicated that all of the carbamates present in the reactor disappeared 2 hours after addition of the alkali metal hydroxide.

When the reaction was completely over, the reactor temperature was allowed to rise to 220° C. for 5 minutes with the reflux condenser removed to evaporate the water present. Upon standing, two liquid layers formed in the reactor, the upper layer being a clear pale yellow color and which was identified to be mostly polypropylene ether triols (polyols). Vacuum purification of this layer in a thin film evaporator at 195° C., 2 mm Hg absolute pressure, yielded 230 grams of a clear pale yellow viscous liquid.

The product obtained above was used to replace up to ten percent by weight of the Pluracol 535 in the formulation given in Table 1. Good low density, high resiliency foams were produced with properties that could not be distinguished from those of a foam made with all virgin polyol.

TABLE I

| | FORMULATION OF FLEXIBLE POLYURETHANE FOAM | | |
|---|---|---|---|
| | Material | Parts by | Description |
| 1. | Pluracol 535 (Polyol) (BASF) | 75 | 1640 eg. wt. mostly triol |
| 2. | Pluracol 581 (Polyol) (BASF) | 25 | 2078 eq. wt. mostly triol; contains styrene and acrylonitrile |
| 3. | Water | 2.8 | Distilled |
| 4. | DABCO (Air Prod.) | 0.14 | Triethylene diamine |
| 5. | X-DM (Air Prod.) | 0.20 | Dimethylaminoethylmorphine |
| 6. | A-1 (Union Carbide) | 0.10 | 70% bis(2-Dimethylaminoethyl) ether, 30% dipropylene glycol |
| 7. | Q-1-5043 (Dow Corning) | 1.4 | Silicone glycol copolymer surfactants |
| 8. | T-12 (M & T) | 0.015 | Dibutyl Tin Dilaurate |
| 9. | E-422 (Mobay) | 35.78 | Polymeric Isocyanates, 20% MDI, 80% TDI |

EXAMPLE 2

The procedure described in Example 1 is repeated, except 600 grams of glycerol are used instead of diethylene glycol. After dissolution, in order to maintain the refluxing temperature at 200° C. during the hydrolysis step, 14.5 grams of water were added with the sodium hydroxide. Separation of phases and vacuum purification produces a residuum with properties similar to the product produced in Example 1.

EXAMPLE 3

The procedure described in Example 1 is repeated, except the sodium hydroxide is added to the diethylene glycol before foam is added. The diethylene glycol begins to change from a colorless liquid to a yellow and then brown liquid. After the dissolution, hydrolysis and purification process is completed, a polyol of dark brown color is recovered. The polyol can only be used to replace 4 percent by weight of Pluracol 535 in the formulation of Table 1 and still give good quality low density foam.

EXAMPLE 4

The procedure described in Example 3 is repeated, except foam dissolution is attempted at 175° C. After 3 hours, the first 100 gram batch of foam had not dissolved, indicating that dissolution at 175° C. is too slow.

EXAMPLE 5

The procedure in Example 1 is repeated except diisopropylene glycol is used as the solvent. After hydrolysis is completed, phase separation does not occur. All 1,200 grams of solution must be purified by vacuum distillation. The polyol residue is turbid and is found to contain sodium hydroxide and styrene acrylic acid copolymers. The polyol can only be used to replace 2 percent by weight of the Pluracol 535 in the formulation given in Table 1 and still give a good quality low density foam.

In view of this disclosure, many modifications of this invention will be apparent to those skilled in the art. It is intended that all such modifications which fall within the true scope of the invention will be included within the terms of the appended claims.

What is claimed is:

1. A process for recovery from polyether polyurethane foam of substantially pure polyether polyol which can be used to make new foam, comprising the steps of:
    (a) forming a solution by dissolving said polyether polyurethane foam in a saturated alcohol having a boiling point of between about 225° C. and about 280° C. at a temperature between about 185° C. and about 220° C. under a non-oxidizing atmosphere;
    (b) adding water and alkali metal hydroxide catalyst to said solution under a non-oxidizing atmosphere, said water being added in an amount sufficient to create a mixture which has a boiling point within the temperature range of from about 175° C. to about 220° C., and said alkali metal hydroxide catalyst being added in an amount of at least about 0.1 weight percent based on the weight of said polyurethane foam;
    (c) refluxing said solution under said non-oxidizing atmosphere to substantially hydrolyze dissolution products subject to hydrolysis into amines and alcohol while (1) periodically adding a sufficient amount of water to maintain a mixture having a boiling point within said range of from about 175° C. to about 220° C. and (2) maintaining said solution at a temperature within said range; and
    (d) subjecting at least a portion of said solution to vacuum purification at a temperature below about 230° C. so as to allow recovery therefrom of substantially pure polyether polyol.

2. A process according to claim 1, which further comprises removing said water from said solution after refluxing.

3. A process according to claim 2, wherein removing said water from solution comprises heating said solution to about 220° C. to evaporate said water from solution.

4. A process according to claim 1 or 2, wherein said portion subjected to vacuum purification is a polyol layer which forms after said solution has been allowed to stand.

5. A process according to claim 1 or 2, wherein dissolving said polyurethane foam in said alcohol (a) causes dissolution of said foam into dissolution products comprising polyol, carbamates and ureas, wherein said carbamates and ureas are subject to hydrolysis into amines and alcohol during refluxing (c).

6. A process according to claim 1 or 2, wherein the weight ratio of said polyurethane foam to said alcohol is between about 1:5 and about 2:1.

7. A process according to claim 6, wherein said weight ratio is about 1:1.

8. A process according to claim 1 or 2, wherein said alcohol is a diol or triol containing an ether linkage.

9. A process according to claim 8, wherein said alcohol is selected from the group consisting essentially of diethylene glycol, dipropylene glycol, glycerol, dibutylene glycol and propylene ethylene glycol.

10. A process according to claim 9, wherein said alcohol is diethylene glycol.

11. A process according to claim 10, wherein said added water is present in an amount by weight of between about 0.6% and 2.4% of said diethylene glycol.

12. A process according to claim 11, wherein said added water is present in an amount by weight of 1.1% of said diethylene glycol.

13. A process according to claim 1 or 2, wherein the temperature of said solution during dissolution step (a) is about 200° C.

14. A process according to claim 1 or 2, wherein said catalyst is added in an amount by weight of between about 0.1% and about 10% of said polyurethane foam.

15. A process according to claim 14, wherein said catalyst is added in an amount by weight of between about 0.5% and about 3% of said polyurethane foam.

16. A process according to claim 15, wherein said catalyst is added in an amount by weight of about 1.5% of said polyurethane foam.

17. A process according to claim 14, wherein said catalyst comprises sodium hydroxide.

18. A process according to claim 14, wherein said catalyst comprises lithium hydroxide.

19. A process according to claim 18, wherein process further comprises adding calcium hydroxide in a weight ratio of about 10:1 relative to the lithium hydroxide.

20. A process according to claim 1 or 2, wherein said vacuum purification comprises batch vacuum purification.

21. A process according to claim 1 or 2, wherein said vacuum purification comprises continuous thin film vacuum evaporation.

22. A process according to claim 1 or 2, wherein said non-oxidizing atmosphere comprises nitrogen.

23. A process for recovery from polyether polyurethane foam of substantially pure polyether polyol which can be used to make new foam, comprising the steps of:
    (a) forming a solution by dissolving said polyurethane foam in diethylene glycol at a temperature between about 185° C. and about 220° C. under a nitrogen atmosphere;
    (b) adding water and sodium hydroxide catalyst to said solution under a nitrogen atmosphere, said water being added in an amount by weight of between about 0.6% and 2.4% of said diethylene glycol and said sodium hydroxide catalyst being added in an amount ranging from about 0.1% to about 10% by weight based on said polyurethane foam weight;

(c) refluxing said solution under nitrogen for a time necessary to substantially hydrolyze dissolution products subject to hydrolysis into amines and diethylene glycol while (1) periodically adding water to maintain the weight percent thereof in relationship to said diethylene glycol in the range of between about 0.6% and 2.4% and (2) maintaining said solution temperature between about 175° C. and 220° C.; and (d) subjecting at least a portion of said solution to vacuum purification at a temperature below about 230° C. so as to allow recovery therefrom of substantially pure polyether polyol, said portion of said solution being a polyether polyol layer which separates from said solution upon standing.

* * * * *